Aug. 31, 1954     H. D. ANSPON ET AL     2,687,555
CASTING OF α-CHLOROACRYLIC ESTER POLYMERS
Filed Dec. 27, 1950
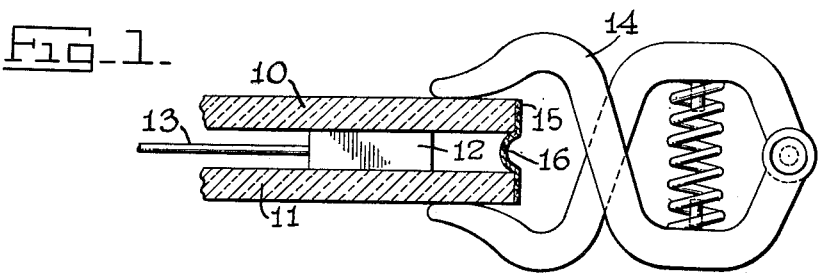
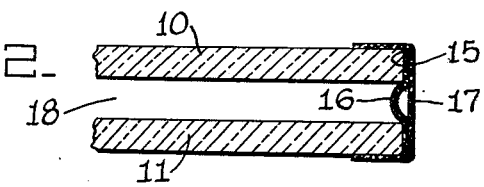
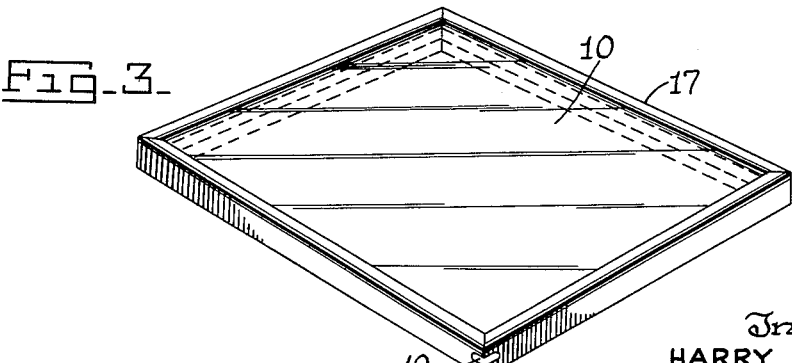
Inventors
HARRY D. ANSPON
FRANK E. PSCHORR
By Walter G. Hensel
Attorney Patented Aug. 31, 1954

2,687,555

UNITED STATES PATENT OFFICE 2,687,555

CASTING OF α-CHLOROACRYLIC ESTER POLYMERS

Harry D. Anspon, Easton, and Frank E. Pschorr, Bethlehem, Pa., asssignors to General Aniline & Film Corporation, New York, N. Y., a corporation of Delaware Application December 27, 1950, Serial No. 202,941

14 Claims. (Cl. 18—39)

1

This invention relates to an improvement in the casting of mass polymer sheets from α-chloroacrylic acid esters, and to an improved mold employed in such casting procedures.

It was known heretofore to cast mass polymer sheets from polymer resin intermediates, e. g. methyl methacrylate, by introducing the corresponding monomer or syrupy partial polymer into a mold comprising a pair of spaced parallel plates of glass or similar inert material, joined at their edges by a flexible closure (e. g. of rubber or a synthetic elastomer) to enclose the composition to be polymerized between the plates, and to allow the plates to move together to compensate for shrinkage of the contents of the mold occurring as an incident to polymerization of its contents. For this purpose, the flexible closure must yield sufficiently to avoid such resistance to shrinkage of the mold contents as would cause partial separation of the mold plates from the polymerizate. Otherwise, surface deformation ("worm tracks") occur in the face of the polymer sheet. At the same time, it is desirable that the edge closure be sufficiently resistant to maintain the mold plates in uniform predetermined spaced relation during filling of the mold and initial stages of polymerization, so that polymer sheets of uniform thickness will be produced. In addition, and especially when a liquid monomer is initially employed, the edge closure for such molds must be inert toward the mold contents, neither dissolving therein so as to cause discoloration, nor inhibiting polymerization of the contents. At the same time, the closure must be leakproof.

Provision of an edge closure for a mold of the type described, having all of the aforesaid properties when employed for polymerization of esters of α-chloroacrylic acid, is relatively difficult. Rubber and synthetic elastomers such as Thiokol (an elastic copolymer of a bi-functional organic compound and a polysulfide) are sufficiently soluble in α-chloroacrylic ester monomers (as distinguished from methacrylic esters) to cause substantial discoloration of the polymer obtained. Even when provided with a protective coating, such closures are unreliable since the coating is readily ruptured, allowing dissolution of the rubber or other elastomer in the ester.

Moreover, when rubber or other elastomers such as Thiokol are interposed between the mold plates to provide an edge closure, they tend, by reason of their resilience, to offer increasing resistance to shrinkage of the polymerizate during polymerization, to an extent often sufficient to cause separation of the mold plates from the polymer and consequent surface defects in the sheet. On the other hand, if relatively soft elastomers are used, they cannot be relied upon to maintain accurate spacing of the mold plates during introduction and early stages of polymerization of the monomer.

It is an object of this invention to provide a mold for casting sheets of α-chloroacrylate ester polymers from the corresponding monomers, in which the edge closure satisfactorily resists dissolution by the monomer or polymer, has no adverse effect on the polymerization, permits and maintains uniform, accurate spacing of the mold plates, and yields readily and uniformly during the polymerization to compensate for shrinkage of the mold contents so that no difficulty is experienced from surface defects in the polymer sheets resulting from separation of the mold plates from the polymer.

Another object of the invention is to provide a process for casting polymer sheets by mass polymerization of α-chloroacrylic esters, employing a mold having an improved edge closure of the nature described.

We have discovered that flexible cellulosic sheet materials such as paper, cellophane, parchment and the like, when coated or impregnated with a film-forming neutral solution of a protein, yield an edge sealing strip for glass molds which, when dry, adheres firmly to the glass to form a leak-proof joint and has all of the advantages and none of the defects hereinbefore described, required for mass polymerization casting of α-chloroacrylic ester sheets. Proteins yielding film-forming solutions of the aforesaid type are especially the water-soluble skleroproteins such as gelatin or glue, and the prolamines which are soluble in alcoholic solvents, e. g. zein, gliadine or hordeine.

Suitable compositions for impregnating sealing strips in accordance with this invention can be formulated as follows, parts being by weight:

Formula 1

100 parts of zein, triturated in
120 parts of methanol, and dissolved by adding
105 parts of chloroform

Formula 2

100 parts of zein, triturated in
105 parts of ethanol, and dissolved by adding
115 parts of nitromethane The nitromethane in this formulation can be replaced by 100 parts of glycol monomethyl ether.

*Formula 3*

10 parts of gelatin, dissolved in
90 parts of boiling water

Construction of a mold in accordance with this invention is shown in the accompanying drawing, wherein Figure 1 is a fragmentary detail, in transverse cross-section, of the edge portion of a mold in process of construction;

Figure 2 is a detail in transverse cross-section of the edge portion of a finished mold; and Figure 3 is a perspective view of the finished mold.

In constructing the mold illustrated in the drawing, a pair of rectangular sheets of plate glass 10 and 11, having similar size and shape, are placed, after thorough cleaning, in face-to-face parallel relationship, corresponding edges being mutually aligned, and the plates being held apart in uniform spaced relationship by spacers 12, preferably of metal such as brass, of which one is shown in Figure 1, having the desired thickness to provide the required dimensions for the space between the plates which receives the polymerizable ester.

For example, the glass plates 10 and 11 can be of one-quarter inch plate glass and about 14 inches square. For casting a plate of methyl α-chloroacrylate polymer of a thickness of one-quarter inch from monomeric methyl α-chloroacrylate, the spacers 12 may have a thickness of 0.324 inch, adapted to compensate for shrinkage of the monomer on polymerization. Spacers 12 are advantageously provided with wires 13 which extend through a filler opening of the mold, so that the spacers can be withdrawn thereby through the opening before introducing the polymerizable liquid into the mold. Plates 10 and 11 are held firmly against spacers 12 by spring clamps 14 of any conventional design, e. g. clamps of the type employed for storage battery terminals.

A strip of cellulosic sheet material 15, e. g. a strip of No. 2 filter paper, cut to a width sufficient to just cover the edges of the spaced plates 10 and 11, is coated twice (allowing an interval of 5 minutes between coatings) with the zein solution of Formula 1, and then applied with its freshly coated surface to the edges of glass plates 10 and 11 as shown in Figure 1. The strip 15 is indented slightly, as indicated at 16, during its application to the plate edges, to insure contact with the plates at the corners of their inside surfaces. The strip 15 is thus applied to extend around all four sides of the plates, leaving a small filler opening at one corner to permit introduction of the monomer into the mold. The clamps 14 are shifted, as required, during application of the strip 15 to facilitate handling thereof. If the strip 15 is applied in several pieces, the ends of these can be overlapped to form a leakproof joint.

The strip 15 is dried, preferably by heating with an infrared lamp while sweeping the interior of the mold with a stream of air or preferably nitrogen. When strip 15 has dried, clamps 14 are removed and spacers 12 withdrawn by means of wires 13 through the filler opening. A second strip of paper 17, similar to strip 15 but wide enough to overlap the faces of the glass plates, is similarly coated with the zein solution of Formula 1 and applied over the strip 15 with its edges overlapping the outer faces of the glass plates 10 and 11 as shown in Figures 2 and 3. The corner opening 19 remains uncovered to serve as a filler opening. After standing for one hour at room temperature, the mold is dry and ready for use.

Monomeric methyl α-chloroacrylate (or another polymerizable monomeric ester of α-chloroacrylic acid) is poured into the interior 18 of the mold through the filler opening 19, the mold being supported in vertical position with the filler opening 19 uppermost. After completion of the filling operation, the filler opening 19 is sealed with a patch of protein-impregnated or -coated sheet material, e. g. a patch of cellophane coated with the viscous aqueous gelatin solution of Formula 3, or with one of the solutions of Formula 1 or 2. When the patch has set, the mold can be laid in horizontal or nearly horizontal position with filler opening 19 slightly elevated, for ensuing polymerization of its contents.

In molds in which the space between the plates is less than one-quarter inch, the second sealing strip 17 can be omitted, although the reinforcement provided thereby renders the spacing of the plates more reliable.

Monomeric methyl α-chloroacrylate was polymerized in molds constructed as described above by irradiation with ultra-violet light, as well as by including a polymerization catalyst (e. g. benzoyl peroxide or tertiary butyl peroxide) in the monomer, and heating at temperatures from 50° to 120° C. In each case, the sheet of polymer produced was not discolored by the sealing strip at the edge of the mold, and polymerization was not inhibited or otherwise adversely affected by contact with the sealing strip. The sheets produced were of uniform thickness, completely transparent, and free of surface defects or discoloration.

Equally satisfactory polymer sheets were obtained by polymerizing methyl α-chloroacrylate in a mold constructed in the manner described above, but in which the sealing strips were of parchment paper coated with the zein solutions of Formula 1 or 2, and also when the sealing strip was a strip of cellophane coated with the aqueous gelatin of Formula 3.

After removal of the spacers from between the plates of the mold and during filling of the mold with the monomer to be polymerized, the cellulosic sheet material sealing strips impregnated or coated with protein in accordance with this invention are sufficiently stiff to maintain the plates in uniformly spaced relation. During polymerization of the monomer, the sealing strips yield inward between the plates to compensate for shrinkage due to polymerization of the mold contents, and offer progressively less resistance to the required convergence of the mold plates as flexure of the strips becomes more pronounced. Accordingly, no excessive resistance to inward motion of the plates is offered, to such an extent as to cause separation of the plates from the mold contents.

Instead of paper, parchment paper or regenerated cellulose film can be employed for making the molds described above. Paper is somewhat preferable to parchment or cellophane because of its lesser tendency to shrink on drying. Solutions of zein or other prolamines in alcoholic solvents of the type illustrated in Formulas 1 and 2 are preferable to aqueous gelatin or glue because of the fact that the compositions dry more rapidly, and the fact that the prolamines have no substantial tendency to shrink on drying, whereas gelatin or glue have a marked tendency to cause shrinkage of the sealing strip.

Other esters of α-chloroacrylic acid which can be mass polymerized like methyl α-chloroacrylate in the manner hereinbefore described to colorless transparent sheets include the ethyl, propyl, butyl, hexyl, octyl, cyclohexyl, methylcyclohexyl, benzyl, phenyl and tolyl esters, the esters of polyhydric alcohols such as glycol di-α-chloroacrylate, and unsaturated esters such as allyl or methallyl α-chloroacrylate.

Other variations and modifications which will be obvious to those skilled in the art can be made in the structure and compositions illustrated herein without departing from the scope or spirit of the invention.

We claim:

1. A mold for casting mass polymer sheets from polymerizable α-chloroacrylic acid esters, comprising a pair of similarly shaped glass plates uniformly spaced apart in face-to-face parallel relation with their corresponding edges mutually aligned, and a strip of flexible cellulosic sheet material extending along and interconnecting the external edge surfaces of the plates, and enclosing the space between them except for a filler opening, said strip having its surface coated with an adhesive protein deposited from a film-forming solution thereof in a volatile solvent and adhering thereby to the edges of the glass plates to form a leakproof seal at the edges thereof, the portion of said strip interconnecting said glass plates being of such stiffness as to maintain said plates in uniformly spaced position during the filling of the mold with said esters but yielding upon contraction of the mold contents during polymerization, said interconnecting portion of said strip being the sole means for spacing said plates during filling of the mold.

2. A mold as defined in claim 1, in which the mid-portion of said strip is longitudinally indented in the space between the plates.

3. A mold as defined in claim 2, wherein a second strip of cellulosic sheet material, similarly coated with protein, is superposed on the first strip and adhering thereto except along the indented mid-portion thereof, with its edge portions overlapping and adhering to the outer faces of the glass plates adjacent their edges.

4. A mold as defined in claim 1, wherein said strip is coated with a prolamine deposited from a solution thereof in a volatile organic solvent.

5. A mold as defined in claim 1, wherein said strip is of absorbent paper coated with zein deposited from a solution thereof in a mixture of methanol and chloroform.

6. A mold as defined in claim 1, wherein said strip is a regenerated cellulose film coated with gelatin deposited from an aqueous solution thereof.

7. A method for constructing a mold for the casting of mass polymer sheets from polymerizable esters of α-chloroacrylic acid, which comprises temporarily supporting a pair of similarly shaped glass plates in spaced parallel face-to-face relation with their external edge surfaces in mutual alignment, applying to the edges of the plates a strip of cellulosic material having its surface coated with an adhesive film-forming solution of a protein in a volatile organic solvent, said strip extending along the edges of the plates to enclose the space between them, evaporating the solvent to cause said strip to adhere to the plate edges and to form a leakproof joint therewith, and releasing the plates from the aforesaid temporary support, the portion of said strip interconnecting said glass plates being of such stiffness as to maintain said plates in uniformly spaced relation during filling of the mold with said esters but yielding upon contraction of the mold contents during polymerization, said interconnecting portion of the strips being the sole means for spacing said plates during filling of the mold after release of the plates from said temporary support.

8. A process as defined in claim 7, in which said strip is coated with a solution of a prolamine in a volatile organic solvent.

9. A process as defined in claim 8, in which said strip is of absorbent paper and said protein solution is a solution of zein in a mixture of chloroform and methanol.

10. A process as defined in claim 7 in which said strip is a regenerated cellulose film and said protein solution is an aqueous solution of gelatin.

11. In a process for casting mass polymer sheets from a polymerizable ester of α-chloroacrylic acid by polymerizing a mass of said ester between a pair of spaced glass plates, the improvement which comprises enclosing the space between said plates with a sealing strip of cellulosic sheet material having its surface coated with a film-forming solution of a protein in a volatile solvent, said coated strip being applied to the external edge surfaces of said plates and secured thereto by drying the protein solution to form a leakproof joint, so as to interconnect said glass plates prior to introduction of the polymerizable ester, the portion of said strip interconnecting said glass plates being of such stiffness after drying as to maintain said plates in uniform spaced relation during filling of the mold with said ester but yielding upon contraction of the mold contents during polymerization, said interconnecting portion of said strip being the sole means for spacing said plates during filling of the mold, filling the mold with said ester, and polymerizing said ester in contact with said strip.

12. A process as defined in claim 11, in which said protein solution is a solution of a prolamine in a volatile organic solvent.

13. A process as defined in claim 11, in which said polymerizable ester is methyl α-chloroacrylate and said sealing strip is of absorbent paper impregnated with a solution of zein in a mixture of chloroform and methanol.

14. A process as defined in claim 11, in which said polymerizable ester is methyl α-chloroacrylate and said sealing strip is of regenerated cellulose film coated with an aqueous solution of gelatin.

References Cited in the file of this patent

UNITED STATES PATENTS

| Number | Name | Date |
|---|---|---|
| 2,154,639 | Rohm et al. | Apr. 18, 1939 |
| 2,328,525 | Egolf | Aug. 31, 1943 |